(12) United States Patent
McCorkendale et al.

(10) Patent No.: US 7,571,485 B1
(45) Date of Patent: Aug. 4, 2009

(54) USE OF DATABASE SCHEMA FOR FRAUD PREVENTION AND POLICY COMPLIANCE

(75) Inventors: Bruce McCorkendale, Manhattan Beach, CA (US); William E. Sobel, Stevenson Ranch, CA (US)

(73) Assignee: Symantec Corporation, Mountain View, CA (US)

( * ) Notice: Subject to any disclaimer, the term of this patent is extended or adjusted under 35 U.S.C. 154(b) by 847 days.

(21) Appl. No.: 11/094,648

(22) Filed: Mar. 30, 2005

(51) Int. Cl.
*G06F 7/04* (2006.01)
(52) U.S. Cl. .......................................... 726/26
(58) Field of Classification Search ................. 726/11, 726/22, 26
See application file for complete search history.

(56) References Cited

U.S. PATENT DOCUMENTS

| | | | |
|---|---|---|---|
| 6,874,084 B1 * | 3/2005 | Dobner et al. .............. | 713/156 |
| 2004/0064731 A1 * | 4/2004 | Nguyen et al. .............. | 713/201 |
| 2004/0139315 A1 * | 7/2004 | Tokutani et al. ............. | 713/156 |
| 2005/0021999 A1 * | 1/2005 | Touitou et al. .............. | 713/200 |
| 2005/0033984 A1 * | 2/2005 | Doherty et al. ............. | 713/201 |

OTHER PUBLICATIONS

Dyck, Timothy, Review: Teros-100 APS 2.1.1, [Online] May 28, 2003, [Retrieved from the Internet on Oct. 6, 2004] Retrieved from the Internet: <URL: http://www.eweek.com/article2/0,1759,1110435,00.asp>, Woburn, MA, U.S.A.

* cited by examiner

*Primary Examiner*—Ellen Tran
(74) *Attorney, Agent, or Firm*—Fenwick & West LLP

(57) ABSTRACT

A network traffic manager detects an attempt by a computer to communicate with a remote site over a computer network. The network traffic manager queries a database containing descriptions of known legitimate sites for an entry describing the remote site, and determines whether the remote site is to be treated as suspicious or legitimate. If there is no entry describing the site in the database, the network traffic manager treats the site as suspicious. If there is an entry describing the remote site, the network traffic manager compares the entry to the site itself, to determine whether the site conforms to the database description. If it does not so conform, the site is treated as suspicious. If the site does conform to its description, it is considered legitimate. In some embodiments, additional tests are performed.

25 Claims, 2 Drawing Sheets

USE OF DATABASE SCHEMA FOR FRAUD PREVENTION AND POLICY COMPLIANCE

TECHNICAL FIELD

This invention pertains generally to computer security, and more specifically to the use of database schema for fraud prevention and policy compliance.

BACKGROUND

Some current anti-phishing technology uses whitelists to identify known legitimate web sites (e.g., the legitimate websites of trusted financial institutions). This is effective to a point, but a whitelist typically only includes the domain names and addresses of known legitimate institutions. Thus, a whitelist can protect a user from being fraudulently directed to a malicious website maintained by a non-trusted party, but does not prevent users from being directed to websites of legitimate institutions that have been compromised by hackers, and thus are no longer secure.

Furthermore, even the websites of legitimate organizations can sometimes request data that a user does not wish to submit. For example, a legitimate banking site can request the social security number of a user within an organization with a privacy policy that dictates never submitting such information over the Internet. Another example is a case in which a website violates its own privacy policy.

What is needed are computer implemented methods, computer readable media and computer systems for determining not only if a target web site is known to be legitimate, but also whether the site has been compromised, and whether the site complies with a desired privacy policy.

DISCLOSURE OF INVENTION

Computer-implemented methods, computer systems and computer-readable media prevent unauthorized network activity. A network traffic manager detects an attempt by a computer to communicate with a remote site over a computer network. The network traffic manager queries a database containing descriptions of known legitimate sites for an entry describing the remote site, and determines whether the remote site is to be treated as suspicious or legitimate. If there is no entry describing the site in the database, the network traffic manager treats the site as suspicious. If there is a database entry describing the remote site, the network traffic manager compares the entry to the remote site itself, to determine whether the remote site conforms to the database description. If it does not so conform, the site is treated as suspicious. In some embodiments, if the site does conform to its description in the database, it is considered legitimate. In other embodiments, additional tests are performed.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
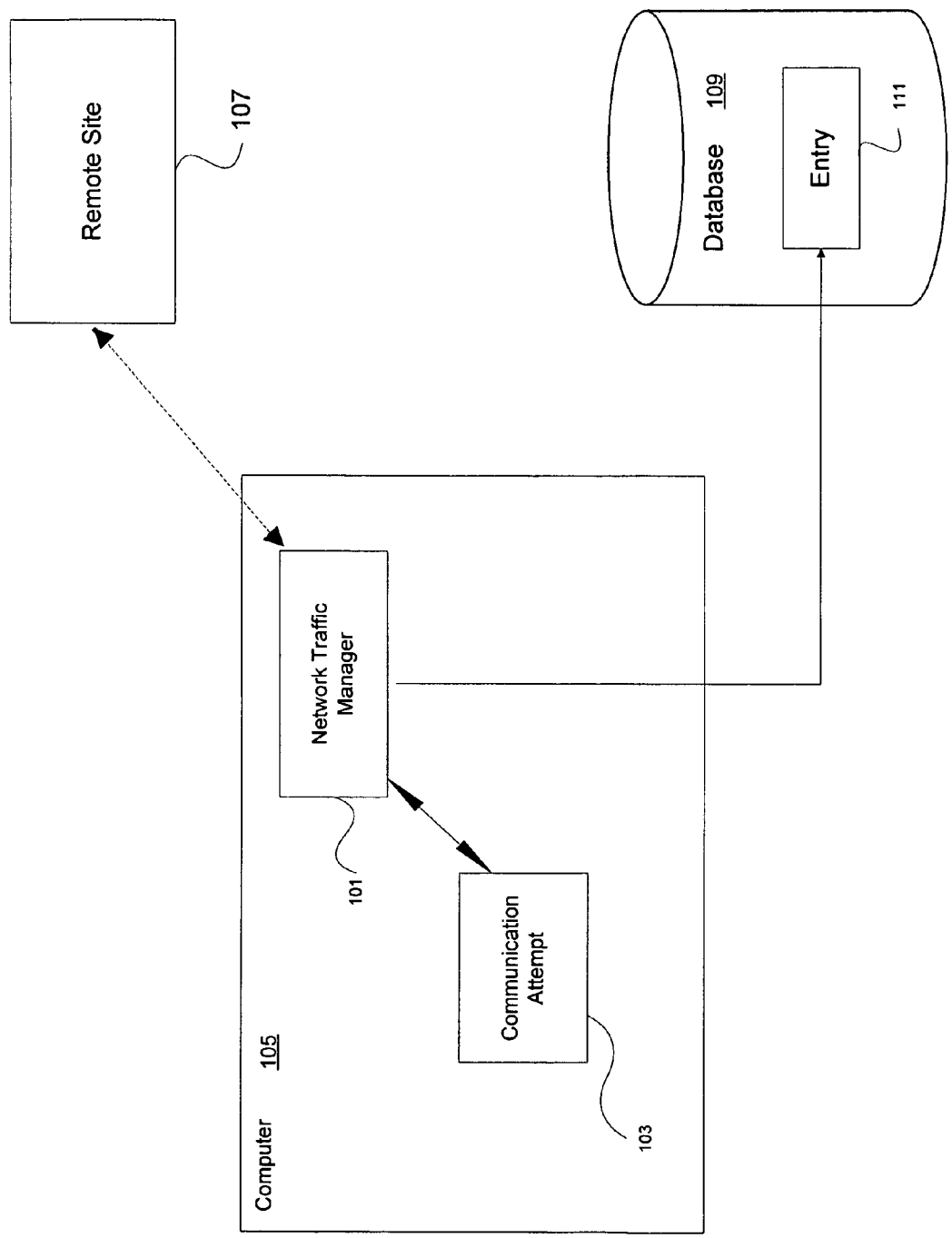
FIG. 1 is a block diagram, illustrating a high level overview of a system for preventing unauthorized network activity, according to some embodiments of the present invention.

FIG. 1 illustrates a high level overview of a system 100 for practicing some embodiments of the present invention. A network traffic manager 101 detects attempts 103 by a computer 105 to communicate with remote sites 107, and queries a database 109 containing descriptions 111 of known legitimate sites 107 for an entry 111 describing the target remote site 107. The network traffic manager 101 determines whether the target remote site 107 is to be treated as suspicious based at least on whether an entry exists in the database 109 corresponding to the site 107.

It is to be understood that although the network traffic manager 101 is illustrated as a single entity, as the term is used herein a network traffic manager 101 refers to a collection of functionalities which can be implemented as software, hardware, firmware or any combination of these. Where a network traffic manager 101 is implemented as software, it can be implemented as a standalone program, but can also be implemented in other ways, for example as part of a larger program, as a plurality of separate programs, as one or more device drivers or as one or more statically or dynamically linked libraries.

It is to be further understood that a network traffic manager 101 can be instantiated on and/or as part of a server, client, firewall, intrusion detection system, proxy, gateway, switch and/or any combination of these and/or other computing devices and/or platforms.

Typically the database 109 (which can be located anywhere on the computer network, and can be instantiated in any database 109 format) contains not only a list of known legitimate sites 107 (i.e., a whitelist) but also information about the sites 107, such as the format of each site 107, the data collected by each site 107, etc. In one embodiment, the database 109 represents a data-gathering profile of known legitimate sites 107. Because the database 109 can be used to describe the data-gathering profile of any site 107 that gathers data, by checking the database 109 the network traffic manager's 101 usefulness can extend beyond anti-phishing functionality, into privacy control and detection of compromised sites 107 as described in detail below.

Typically, having an entry 111 in the database 109 at all identifies a site 107 as known-good, although not necessarily non-compromised. Following the description 111 of the site 107 in the database 109 (e.g., the data gathering profile) further identifies the site 107 as being un-compromised (rather, not following the profile identifies the site 107 as being possibly compromised, and thus suspicious). Note that although in one embodiment the descriptions 111 of sites 107 in the database 109 are in the form of data gathering profiles for the sites 107, in other embodiments the descriptions 111 comprise additional and/or alternative descriptive information concerning the sites 107, for example layout and/or appearance information, as desired.

In some embodiments, the database 109 schema is hierarchical in design, such that classes can be defined and inherited from for specialization. For example, a high level schema class for financial institutions can describe the financial data legitimately gathered by a typical financial institution. Such a schema class could use Uniform Resource Locater (URL) and/or Secure Socket Layer (SSL) certificate identifier information as keys, and could include account numbers, names, addresses, phone numbers, social security numbers, etc., as well as an indicator as to whether or not the site uses SSL. Classes for each specific financial institution can be derived from the general financial institution class, and, where that institution varies from the standard represented by the general class, the specific class can override or add. An example might be that, while the general class specifies that social security numbers are gathered, a specific institution now in compliance with a regional prohibition against gathering social-security numbers could indicate that it specifically does not gather social security numbers.

General classes can be used whenever there are groups of sites 107 that share enough similarity in their data-gathering profile (or other descriptive information) that efficiency is gained through the hierarchical sorting of the class-based scheme. Otherwise, individual classes can be created for each needed site description (e.g., each data-gathering profile). In some embodiments the schema and database 109 are represented in Extensible Markup Language (XML), although other representations (including non-object oriented models) are possible, and the use thereof within the context of the present invention will be readily apparent to those of ordinary skill in the relevant art in light of this specification.

In some embodiments, when the network traffic manager 101 queries the database 109 for an entry 111 describing the remote site 107, the network traffic manager 101 further attempts to obtain an updated entry 111 from a trusted source and update the database 109 accordingly. Where the network traffic manager 101 locates an entry 111 in the database 109, the network traffic manager 101 checks a trusted source for a more current entry 111. When no entry 111 is found in the database 109, the network traffic manager 101 attempts to obtain an entry 111 from a trusted source. In either case, if updated information is found, the network traffic manager 101 updates the database 109 accordingly.

It is to be understood that the trusted source can be in the form of a trusted server or other computing device (not illustrated) from which updated entries 111 are distributed, or even the remote site 107 itself, where data from the remote site 107 is signed with a legitimate certificate, as explained below.

Figure 2:
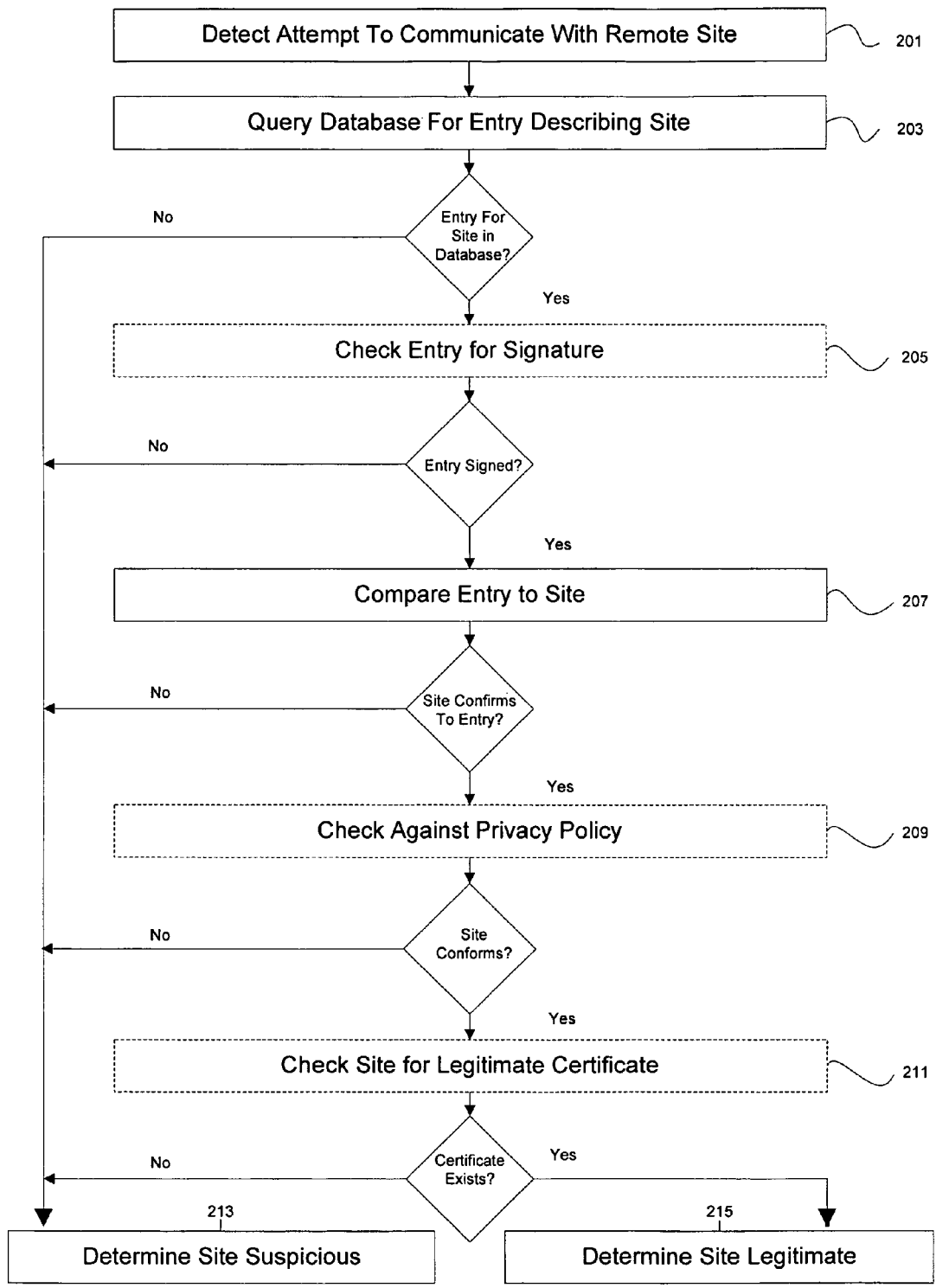
FIG. 2 is a flowchart, illustrating steps for preventing unauthorized network activity, according to some embodiments of the present invention.

Turning now to FIG. 2, in some embodiments the network traffic manager 101 detects 201 an attempt 103 by a computer 105 to communicate with a remote site 107 over a computer network. In response, the network traffic manager 101 queries 203 the database 109 to determine whether there is an entry 111 therein describing the remote site 107.

If there is no entry 111 in the database 109 corresponding to the remote site 107, the network traffic manager 101 determines 213 that the remote site 107 is suspicious. On the other hand, if the network traffic manager 101 locates an entry 111 describing the site 107, the network traffic manager 101 examines the entry 111. In one embodiment of the present invention, responsive to locating an entry 111 in the database 109 describing the remote site 107, the network traffic manager 101 checks 205 the entry to determine whether the entry 111 is signed with a trusted signature. In such embodiments, if the entry 111 is not properly signed the network traffic manager 101 determines 213 that the remote site 107 is suspicious. On the other hand, if the entry 111 is properly signed, the network traffic manager 101 continues examining the entry 111 to determine whether or not it is suspicious.

Of course, not all embodiments require the database 109 entries 111 to be signed, but signed schema raise the bar for hackers. The mechanics and various implementation options for signing database 109 entries 111 are known to those of ordinary skill in the relevant art, and the use thereof within the context of the present invention will be readily apparent to those of such a skill level in light of this specification.

As illustrated in FIG. 2, the network traffic manager 101 compares 207 the database 109 entry 111 describing the remote site 107 to the remote site 107 itself, to determine whether the remote site 107 conforms to the database 109 description 111. For example, in one embodiment such a comparison comprises comparing a data gathering profile for the site 107 described by the database entry 111 to requests for data made by the remote site 107 itself.

Responsive to the remote site 107 not conforming to the database 107 description 111, the network traffic manager 101 determines 213 that the remote site 107 is suspicious. If the remote site 107 does conform to the database 109 description 111, in some embodiments the network traffic manager 101 simply determines 215 that the remote site 107 is legitimate. In other embodiments, the network traffic manager 101 performs additional tests to determine the legitimacy of the site 107.

For example, as illustrated in FIG. 2, in some embodiments, the network traffic manager 101 determines 209 further whether data requested by the remote site 107 complies with a privacy policy. If not, the network traffic manager 101 determines 213 that the remote site 107 is suspicious. If the site 107 does conform to the privacy policy, in some embodiments the network traffic manager 101 determines 215 that the remote site 107 is legitimate, whereas in other embodiments the network traffic manager 101 performs additional tests to verify the site's 107 legitimacy as desired.

In some embodiments, the network traffic manager 101 determines 211 whether the remote site 107 uses a security certificate protocol (e.g., SSL), and whether the site 107 currently has a legitimate certificate. If the site 107 does not use a security certificate protocol or does not have a legitimate certificate, the network traffic manager 101 determines 213 that the remote site 107 is suspicious. If the site 107 uses a uses a security certificate protocol and has a legitimate certificate, in some embodiments the network traffic manager 101 determines 215 that the remote site 107 is legitimate, whereas in other embodiments the network traffic manager 101 performs additional tests to verify the site's 107 legitimacy as desired.

It is to be noted that the steps 205, 209 and 211 are not all performed in every embodiment, and need not be performed in any specific order. In various embodiments none, one or more than one of these steps are performed, in varying orders.

Once the network traffic manager 101 has determined whether the remote site 107 is legitimate or suspicious, the network traffic manager 101 can perform various appropriate actions as desired. For example, responsive to determining that the remote site 107 is legitimate, the network traffic manager 101 can allow the computer 105 to communicate with the remote site 107 over the computer network. Responsive to determining that the remote site 107 is suspicious, the network traffic manager 101 can, for example, block the computer 105 from communicating with the remote site 107, monitor communication between the computer 105 and the remote site 107, restrict communication between the computer 105 and the remote site 107 and/or alert the user of the attempt to communicate with the suspicious remote site 107.

As explained above, the network traffic manager 101 enables identification of appropriate sites 107 for users to exchange personal information with, and for verification that those sites 107 follow a particular description, such as a specific data-gathering profile. Without a database 109 allowing for such verification, users and application programs have little upon which to base their trust of a given site 107. As explained above, the network traffic manager 101 is not limited to detecting improper leakage of known sensitive data, but can also detect privacy policy violations by known sites 107; violations that might be indicative that a site 107 has been compromised (i.e. hacked and modified). Of course, the whitelist capabilities allow the restriction of sensitive information distribution only to the proper sites 107 (and conversely the blocking of said information to other, improper sites 107).

As will be understood by those familiar with the art, the invention may be embodied in other specific forms without departing from the spirit or essential characteristics thereof. Likewise, the particular naming and division of the modules, managers, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A computer implemented method for preventing unauthorized network activity, the method comprising the steps of:
   detecting an attempt by a computer to communicate with a remote site over a computer network;
   querying a database containing descriptions of known legitimate sites for an entry describing the remote site, wherein the database has hierarchical entries according to a schema, and a level of the hierarchy describes data gathered by a class of remote sites;
   responsive to locating an entry in the database describing the remote site, comparing a data gathering profile for the site described by the database entry to a request for data made by the remote site; and
   determining whether the remote site is to be treated as suspicious based at least on the results of the comparing step.

2. The method of claim 1 further comprising:
   responsive to locating an entry in the database describing the remote site, comparing the database entry describing the remote site to the remote site itself, to determine whether the remote site conforms to the database description.

3. The method of claim 2, further comprising at least one step from a group of steps consisting of:
   responsive to determining that the remote site conforms to the database description, determining that the remote site is legitimate; and
   responsive to determining that the remote site does not conform to the database description, determining that the remote site is suspicious.

4. The method of claim 1 further comprising:
   determining further whether data requested by the remote site complies with a privacy policy.

5. The method of claim 4, further comprising at least one step from a group of steps consisting of:
   responsive at least to determining that data requested by the remote site complies with the privacy policy, determining that the remote site is legitimate; and
   responsive at least to determining that data requested by the remote site does not comply with the privacy policy, determining that the remote site is suspicious.

6. The method of claim 1 further comprising:
   determining further whether the remote site uses a security certificate protocol, and whether there is a legitimate certificate associated with the remote site.

7. The method of claim 6 further comprising at least one step from a group of steps consisting of:
   responsive at least to determining that the remote site uses a security certificate protocol, and that there is a legitimate certificate associated with the remote site, determining that the remote site is legitimate; and
   responsive at least to determining that the remote site does not use a security certificate protocol, or that there is not a legitimate certificate associated with the remote site, determining that the remote site is suspicious.

8. The method of claim 1 further comprising:
   responsive to locating an entry in the database describing the remote site, determining whether there is a trusted signature associated with the entry; and
   responsive to determining that there is not a trusted signature associated with the entry, determining that the remote site is suspicious.

9. The method of claim 1 further comprising:
   responsive to not locating an entry in the database describing the remote site, determining that the remote site is suspicious.

10. The method of claim 3, 5, 7, 8 or 9 further comprising:
    performing at least one additional step from a group of steps consisting of:
    responsive to determining that the remote site is legitimate, allowing the computer to communicate with the remote site over the computer network;
    responsive to determining that the remote site is suspicious, blocking the computer from communicating with the remote site over the computer network;
    responsive to determining that the remote site is suspicious, monitoring communication between the computer and the remote site over the computer network;
    responsive to determining that the remote site is suspicious, restricting communication between the computer and the remote site over the computer network; and responsive to determining that the remote site is suspicious, alerting a user of the attempt to communicate with the suspicious remote site.

11. The method of claim 1 wherein querying the database further comprises obtaining the entry from a remote trusted source.

12. The method of claim 1, wherein the database describes data-gathering profiles of known legitimate sites.

13. The method of claim 1, wherein the data gathering profile for the site indicates that the site does not gather a type of data and wherein the comparing determines whether the site requests data of a type that the profile indicates the site does not gather.

14. A computer readable medium containing a computer program product for preventing unauthorized network activity, the computer program product comprising:
   program code for detecting an attempt by a computer to communicate with a remote site over a computer network;
   program code for querying a database containing descriptions of known legitimate sites for an entry describing the remote site, wherein the database has hierarchical entries according to a schema, and a level of the hierarchy describes data gathered by a class of remote sites;
   program code for comparing a data gathering profile for the site described by the database entry to a request for data made by the remote site; and
   program code for determining whether the remote site is to be treated as suspicious based at least on the results of the comparing step.

15. The computer program product of claim 14 further comprising:
   program code for, responsive to locating an entry in the database describing the remote site, comparing the database entry describing the remote site to the remote site itself, to determine whether the remote site conforms to the database description;
   program code for, responsive to determining that the remote site conforms to the database description, determining that the remote site is legitimate; and
   program code for, responsive to determining that the remote site does not conform to the database description, determining that the remote site is suspicious.

16. The computer program product of claim 14 further comprising:
   program code for determining further whether data requested by the remote site complies with a privacy policy;
   program code for, responsive at least to determining that data requested by the remote site complies with the privacy policy, determining that the remote site is legitimate; and
   program code for, responsive at least to determining that data requested by the remote site does not comply with the privacy policy, determining that the remote site is suspicious.

17. The computer program product of claim 14 further comprising:
   program code for determining further whether the remote site uses a security certificate protocol, and whether there is a legitimate certificate associated with the remote site;
   program code for, responsive at least to determining that the remote site uses a security certificate protocol, and that there is a legitimate certificate associated with the remote site, determining that the remote site is legitimate; and
   program code for, responsive at least to determining that the remote site does not use a security certificate protocol, or that there is not a legitimate certificate associated with the remote site, determining that the remote site is suspicious.

18. The computer program product of claim 14 further comprising:
   program code for, responsive to locating an entry in the database describing the remote site, determining whether there is a trusted signature associated with the entry; and
   program code for, responsive to determining that there is not a trusted signature associated with the entry, determining that the remote site is suspicious.

19. The computer program product of claim 14 wherein the program code for querying the database further comprises:
   program code for obtaining the entry from a remote trusted source.

20. A computer system for preventing unauthorized network activity, the computer system comprising:
   a software portion configured to detect an attempt by a computer to communicate with a remote site over a computer network;
   a software portion configured to query a database containing descriptions of known legitimate sites for an entry describing the remote site, wherein the database has hierarchical entries according to a schema, and a level of the hierarchy describes data gathered by a class of remote sites;
   a software portion configured to compare a data gathering profile for the site described by the database entry to a request for data made by the remote site; and
   a software portion configured to determine whether the remote site is to be treated as suspicious based at least on the results of the comparing step.

21. The computer system of claim 20 further comprising:
   a software portion configured to compare the database entry describing the remote site to the remote site itself, to determine whether the remote site conforms to the database description, responsive to locating an entry in the database describing the remote site;
   a software portion configured to determine that the remote site is legitimate, responsive to determining that the remote site conforms to the database description; and
   a software portion configured to determine that the remote site is suspicious, responsive to determining that the remote site does not conform to the database description.

22. The computer system of claim 20 further comprising:
   a software portion configured to determine further whether data requested by the remote site complies with a privacy policy;
   a software portion configured to determine that the remote site is legitimate, responsive at least to determining that data requested by the remote site complies with the privacy policy; and
   a software portion configured to determine that the remote site is suspicious, responsive at least to determining that data requested by the remote site does not comply with the privacy policy.

23. The computer system of claim 20 further comprising:
   a software portion configured to determine further whether the remote site uses a security certificate protocol, and whether there is a legitimate certificate associated with the remote site;
   a software portion configured to determine that the remote site is legitimate, responsive at least to determining that the remote site uses a security certificate protocol, and that there is a legitimate certificate associated with the remote site; and a software portion configured to determine that the remote site is suspicious, responsive at least to determining that the remote site does not use a security certificate protocol, or that there is not a legitimate certificate associated with the remote site.

24. The computer system of claim 20 further comprising:

a software portion configured to determine whether there is a trusted signature associated with the entry, responsive to locating an entry in the database describing the remote site; and a software portion configured to determine, responsive to determining that there is not a trusted signature associated with the entry, that the remote site is suspicious.

25. The computer system of claim 20 wherein the software portion configured to query the database further comprises:

a software portion configured to obtain the entry from a remote trusted source.

\* \* \* \* \*